(12) United States Patent
Watanabe et al.

(10) Patent No.: US 6,421,036 B1
(45) Date of Patent: Jul. 16, 2002

(54) ACTIVE MATRIX TYPE LIQUID CRYSTAL DISPLAY

(75) Inventors: Makoto Watanabe; Takahiko Watanabe, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,248

(22) Filed: May 27, 1999

(30) Foreign Application Priority Data

Jun. 2, 1998 (JP) .......................... 10-153289

(51) Int. Cl.⁷ ................................. G09G 3/36
(52) U.S. Cl. ....................... 345/87; 349/181
(58) Field of Search ..................... 345/87, 89, 90, 345/92, 97; 349/117, 177, 181, 84, 85, 99, 122, 123, 127, 128, 133, 139

(56) References Cited

U.S. PATENT DOCUMENTS

| | | | |
|---|---|---|---|
| 4,896,947 A | 1/1990 | Leenhouts | 350/337 |
| 5,519,523 A | * 5/1996 | Modokoro et al. | 359/73 |
| 5,576,867 A | 11/1996 | Baur et al. | |

FOREIGN PATENT DOCUMENTS

| | | |
|---|---|---|
| JP | 63-115137 | 5/1988 |
| JP | 4-265948 | 9/1992 |
| JP | 6-130394 | 5/1994 |
| JP | 7-225388 | 8/1995 |
| JP | 8-313896 | 11/1996 |
| JP | 10-55001 | 2/1998 |
| JP | 10-170939 | 6/1998 |
| JP | 10-206897 | 8/1998 |

* cited by examiner

Primary Examiner—Regina Liang
(74) Attorney, Agent, or Firm—Hutchins, Wheeler & Dittmar

(57) ABSTRACT

A liquid crystal display panel is provided to an active matrix type liquid crystal display. A TFT side substrate and an opposite side substrate are provided to the liquid crystal display panel. A liquid crystal layer is provided between these substrates. The product (retardation) "Δn·d" of the refractive index anisotropy Δn of a liquid crystal material in the liquid crystal layer and the thickness d of the liquid crystal layer is 0.12 to 0.18 μm.

8 Claims, 8 Drawing Sheets

FIG. 9

| CHEMICAL STRUCTURE | PHASE TRANSITION TEMPERATURE/°C | Δε | Δn | γ₁/mPa·s | η/mPa·s | K33/K11 | K11 | K22 | K33 |
|---|---|---|---|---|---|---|---|---|---|
| C5H11-[structure] | C 38 SB 73 N 95 I | — | — | — | — | — | — | — | — |
| C3H7-[structure] | C 44 SB 75 N 96 I | — | — | — | — | — | — | — | — |
| CH3O-[structure] | C 16.6 N 44.0 I | −0.20 | 0.066 | 27 | — | 1.2 | 6.73 | 3.69 | 7.94 |
| C2H5O-[structure] | C 13.1 N 45.3 I | −0.31 | 0.065 | 41 | — | 1.1 | 7.07 | 3.78 | 8.08 |
| C2H5O-[structure] | C 43.0 N 75.3 I | −0.20 | 0.070 | 20 | — | 1.3 | 8.71 | 4.13 | 11.2 |
| C2H5O-[structure] | C 10.5 SB 43.0 I | −0.31 | 0.060 | 29 | — | 0.9 | 5.89 | 2.82 | 5.46 |
| C3H7-[structure]-C5H11 | C 23 SB 96.1 | — | — | — | — | — | — | — | — |
| C4H9O-[structure] | C 60 N 62.0 I | 0.36 | 0.088 | — | — | 0.89 | 8.06 | 3.65 | — |
| C4H9O-[structure] | C 36 N 36.7 I | −0.34 | 0.084 | — | — | 0.90 | 7.88 | 4.08 | — |

ACTIVE MATRIX TYPE LIQUID CRYSTAL DISPLAY

BACKGROUND OF THE INVENTION

1. Field of the Invention

The present invention relates to an active matrix type liquid crystal display in which liquid crystal is driven by an electric field of components in parallel with the surface of a panel substrate.

2. Description of the Related Art

For liquid crystal displays, as one system to apply an electric field to liquid crystal, there is a static drive system to stationarily supply a constant voltage signal to each electrode. However, when a display of large capacity is performed, a very large number of pieces of signal lines are required in a static drive system. Therefore, recently, when a display of large capacity is performed, generally, a multiplex drive system to supply signal voltage by time sharing is employed.

Among multiplex drive systems, according to an active matrix system in which the electric charge applied to an electrode is held until the next frame is displayed, a display of a high grade is performed.

Furthermore, among active matrix systems, there are a system in which an electric field of components perpendicular to the surface of a panel substrate is applied to liquid crystal, and a system in which an electric field of components parallel to the surface of a panel substrate is applied to liquid crystal (In-Plane Switching system, hereafter, referred to simply as "IPS system"), with respect to the direction of an electric field applied to liquid crystal. Among them, the IPS system is suitable for the use of a large monitor since a wide angle of visibility can be obtained.

For example, a liquid crystal display of the latter IPS system is proposed in Japanese Patent Laid-Open Publication No. 7-225388 (published on Aug. 22, 1995). In the conventional liquid crystal display, retardation of the liquid crystal composition layer is 0.21 to 0.36 $\mu$m. The retardation of the liquid crystal composition layer means the product ($\Delta n \cdot d$) of the refractive index anisotropy $\Delta n$ and the thickness of the liquid crystal layer (cell gap) d.

However, in a conventional liquid crystal display of the IPS system, there is such a problem that a phenomenon of blue staining or yellow staining occurs because of the refractive index anisotropy of a liquid crystal molecule when a screen is viewed from a severely slant view at a comparatively large visual angle. Such a phenomenon is called color-tint. Especially, the grade of yellow staining is remarkable, and it is difficult for the original color viewed from the front to reappear.

SUMMARY OF THE INVENTION

It is an object of the present invention to provide an active matrix type liquid crystal display of the IPS system in which a good color reproducibility is obtained regardless of the angle of visibility.

According to one aspect of the present invention, an active matrix type liquid crystal display may has a liquid crystal display panel. The liquid crystal display panel may comprise two substrates and a liquid crystal layer provided between the two substrates. The product "$\Delta n \cdot d$" of the refractive index anisotropy $\Delta n$ of a liquid crystal material in the liquid crystal layer and the thickness d of the liquid crystal layer is preferably 0.12 to 0.18 $\mu$m.

According to one aspect of the present invention, at all angles of visibility, the shift of chromaticity, especially the shift to yellow can be restrained. Furthermore, according to one aspect of the present invention, in some cases, the liquid crystal display panel may be stained blue when displaying halftone of white, but the effect to restrain the shift to yellow with a high luminosity is larger since the luminosity of blue is extremely lower than that of yellow. As a result, a good color reproducibility can be obtained regardless of the angle of visibility.

BRIEF DESCRIPTION OF THE DRAWINGS

FIG. 9 is a diagram showing examples of liquid crystal materials applicable to the present invention.

DESCRIPTION OF THE PREFERRED EMBODIMENT

Figure 1:
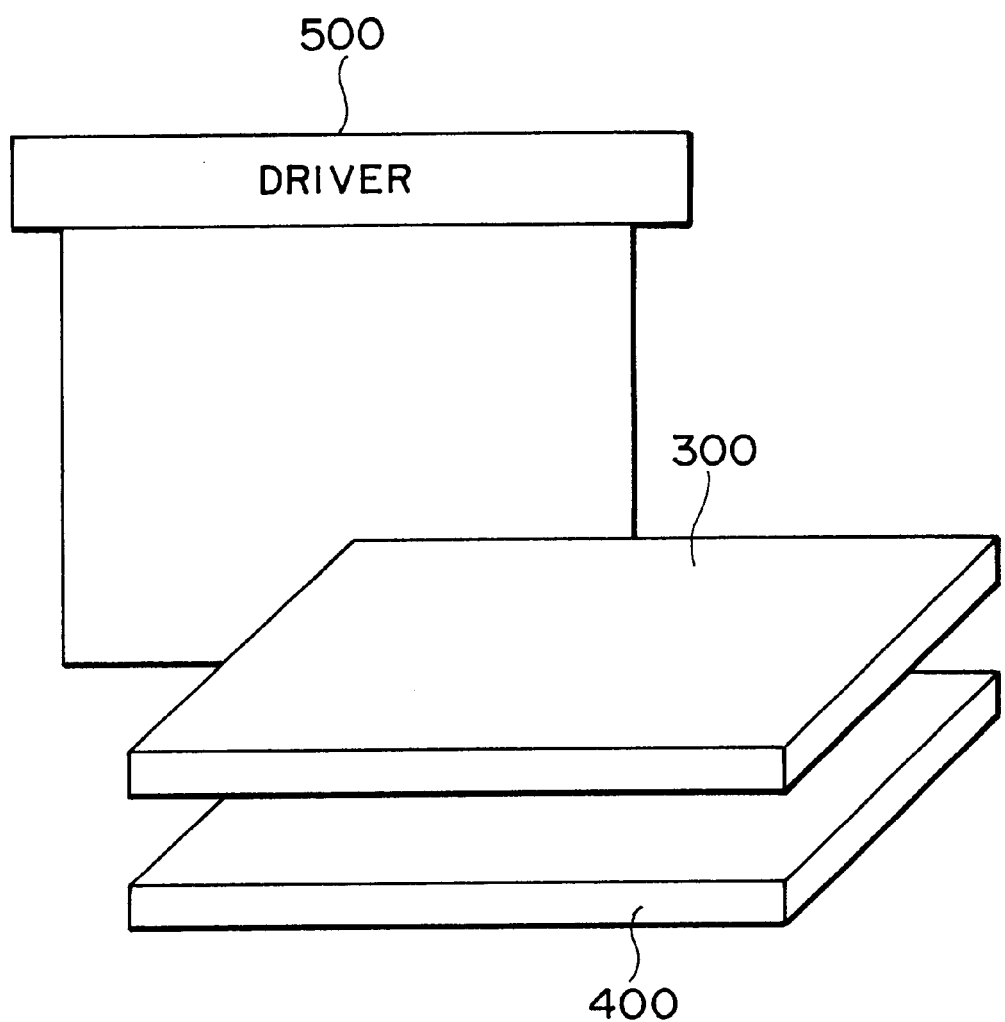
FIG. 1 is a schematic diagram showing the outline of an active matrix type liquid crystal display according to an embodiment of the present invention.
Figure 2:
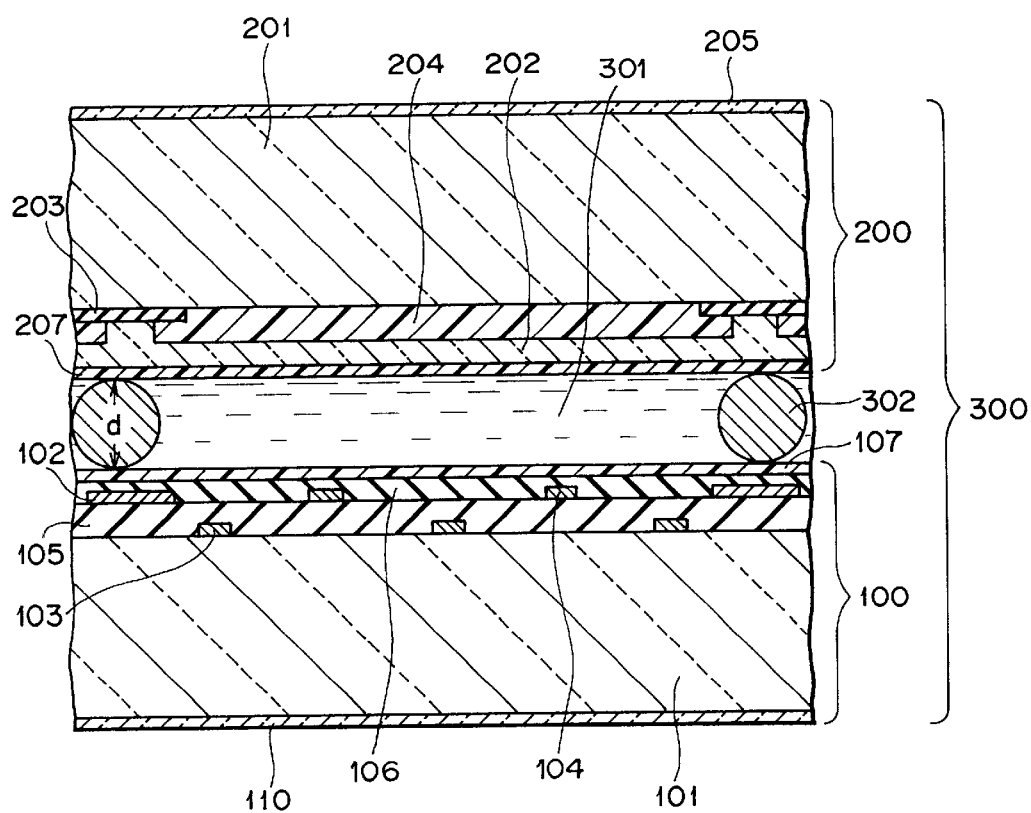
FIG. 2 is a sectional view showing a liquid crystal display panel of the liquid crystal display according to an embodiment of the present invention.
Figure 3:
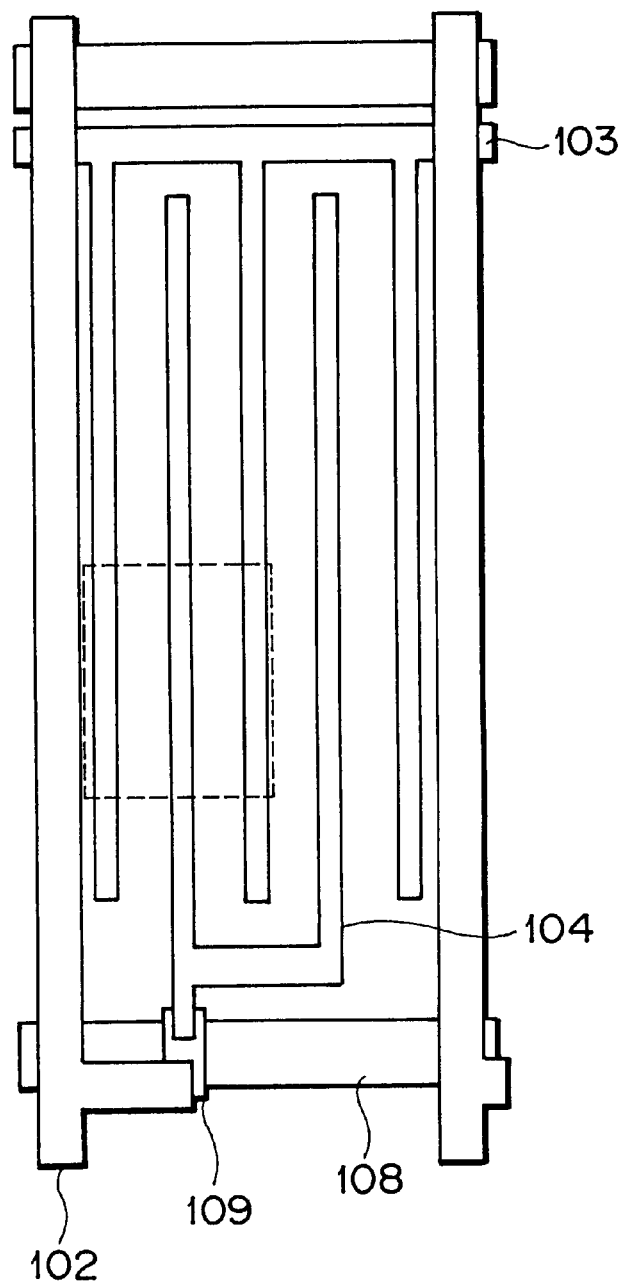
FIG. 3 is a plane view showing a unit picture element of the liquid crystal display panel shown in FIG. 2.
Figure 4:
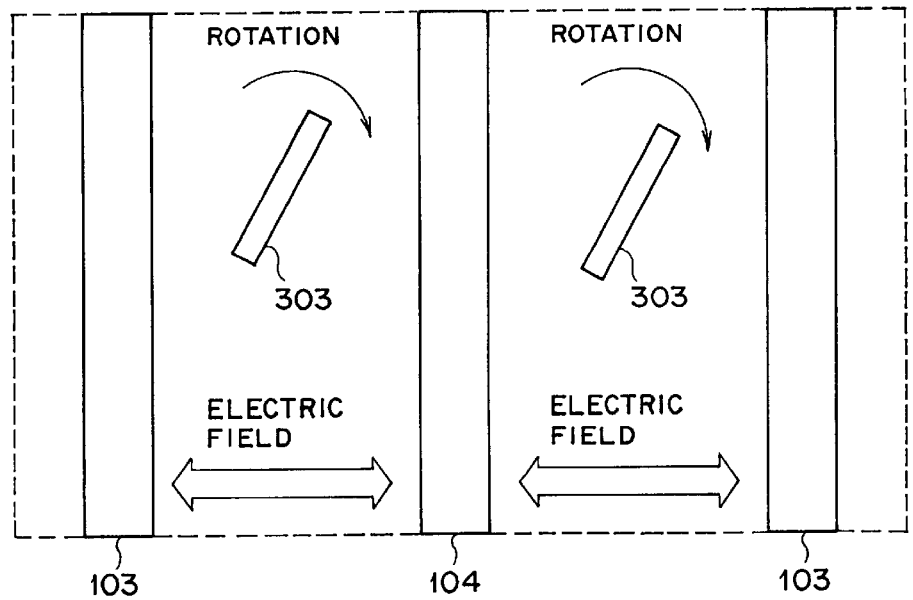
FIG. 4 is an enlarged diagram of the main part of the liquid crystal display shown in FIG. 2.

An active matrix type TFT (thin film transistor) liquid crystal display according to an embodiment of the present invention will concretely be described below by referring to accompanying drawings. FIG. 1 is a schematic diagram showing the outline of an active matrix type liquid crystal display according to an embodiment of the present invention. FIG. 2 is a sectional view showing a liquid crystal display panel of a liquid crystal display according to an embodiment of the present invention. FIG. 3 is a plane view showing a unit picture element of the liquid crystal display panel shown in FIG. 2, and FIG. 4 is an enlarged diagram of the main part of an area shown by broken lines in FIG. 2.

In the embodiment of the present invention, as shown in FIG. 1, a liquid crystal display panel 300 is arranged on a back light 400. A plurality of thin film transistors (not shown) are provided to the liquid crystal display panel 300. A liquid crystal driver circuit 500, which drives the thin film transistors, is connected to the liquid crystal display panel 300.

In the liquid crystal display panel 300, as shown in FIG. 2, a TFT side substrate 100 and a opposite side substrate 200 may be arranged in parallel with each other. A spacer 302 is put and held between the opposite side substrate 200 and the TFT side substrate 100, and a cell gap is formed between them. In the cell gap, a liquid crystal layer including a liquid crystal molecule 301 is provided.

A TFT side glass substrate 101 may be provided on a TFT side polarizing plate 110 in the TFT side substrate 100. A plurality of common electrodes 103 are formed on the surface of the TFT side glass substrate 101, and each common electrode 103 is covered by an interlayer insulating film 105. Furthermore, a plurality of signal lines 102 and a plurality of picture element electrodes 104 electrically connected to the signal lines 102 are formed on the interlayer insulating film 105. An electric field (lateral electric field) of components in parallel to the substrate is formed by the common electrodes 103 and the picture element electrodes 104. The common electrodes 103 and the picture element electrodes 104 are covered by a protection insulating film 106. The common electrodes 103 and the picture element electrodes 104 are arranged alternately in the plane view in a unit picture element. A TFT side orientation film 107 processed by rubbing is formed on the protection insulating film 106 for orientation of the liquid crystal 301. The TFT side polarizing plate 110 is stuck on the TFT side glass substrate 101 in such a way that the transmission axis of the TFT side polarizing plate 110 is at right angles to the rubbing direction of the TFT side orientation film 107.

An opposite side glass substrate 201 may be provided on an opposite side polarizing plate 205 in the substrate 200. A shading film 203 is formed like a matrix on the opposite side glass substrate 201. A color layer 204 for the color display is selectively formed on the opposite side glass substrate 201 and the shading film 203. A flattening film 202 is formed on the color layer 204. Then, an opposite side orientation film 207 processed by rubbing is formed for orientation of the liquid crystal 301 on the flattening film 202. The rubbing direction is preferably reverse to that of the TFT side orientation film 107. The surface of the opposite side substrate 200 is flattened by the flattening film 202. Furthermore, the opposite side polarizing plate 205 is stuck on the opposite side glass substrate 201 in such a way that the transmission axis of the opposite side polarizing plate 205 is at right angles to the direction of the transmission axis of the TFT side polarizing plate 110.

The TFT side substrate 100 and the opposite side substrate 200 are stuck on each other with the spacer 302 in such a way that the orientation films 107 and 207 are reverse to each other. Consequently, as mentioned above, a cell gap is formed between both substrates 100 and 200. Then, the liquid crystal layer including the liquid crystal molecule 301 is sealed in the cell gap. The thickness d of the liquid crystal layer between both substrates 100 and 200 is determined by the diameter of the spacer 302. The product "$\Delta n \cdot d$" of the refractive index anisotropy $\Delta n$ of the liquid crystal molecule 301 and the thickness d of the liquid crystal layer is 0.12 to 0.18 $\mu$m.

Furthermore, as shown in FIG. 3, a scanning line 108 and a signal line 102 connected to the driver circuit 500 are provided to each unit picture element. Near the intersection of the scanning line 108 and the signal line 102, a thin film transistor 109 is arranged as a switching element. Then, the comb-teeth-shaped picture element electrode 104 is connected to the thin film transistor 109. Furthermore, the common electrode 103 extending in the reverse direction to that of the picture element electrode 104 is provided.

Next, the action of the liquid crystal display composed as mentioned above will be described.

By a signal transmitting through the scanning line 108 provided at the same layer as the common electrode 103, ON/OFF of the thin film transistor 109 is shifted. When the thin film transistor 109 is ON, the electric charge is allowed to flow into the picture element electrode 104 from the signal line 102. After that, when the thin film transistor 109 is OFF, the electric charge is held in the picture element electrode 104 to hold a fixed electric potential. A fixed direct current voltage is applied to the common electrode 103 at all times. The difference of electric potential between the picture element electrode 104 and the common electrode 103 is changed by such a change of electric potential of the picture element electrode 104. Then, a lateral electric field in parallel to the surfaces of the TFT side glass substrate 101 and the opposite side glass substrate 201 is generated. Signals to the scanning line 108, the signal line 102, and the common electrode 103 are supplied from the driver circuit 500.

When a lateral electric field is generated in the liquid crystal display panel 300, the liquid crystal molecule 303 rotates by the interaction of the dielectric constant anisotropy thereof and the surrounding lateral electric field, as shown in FIG. 4. In FIG. 4, the rotational direction in the case where the dielectric constant anisotropy of the liquid crystal molecule 303 is positive is shown. In the case where the dielectric constant anisotropy is negative, the rotational direction is reverse. By the rotation of the liquid crystal molecule 303, the quantity of the light which has been emitted from the back light 400 and is transmitting through the liquid crystal display panel 300 changes in the area where a shading film 203, a picture element electrode 104, a common electrode 103, a scanning line 108, and a thin film transistor 109 are not provided.

Figure 5:
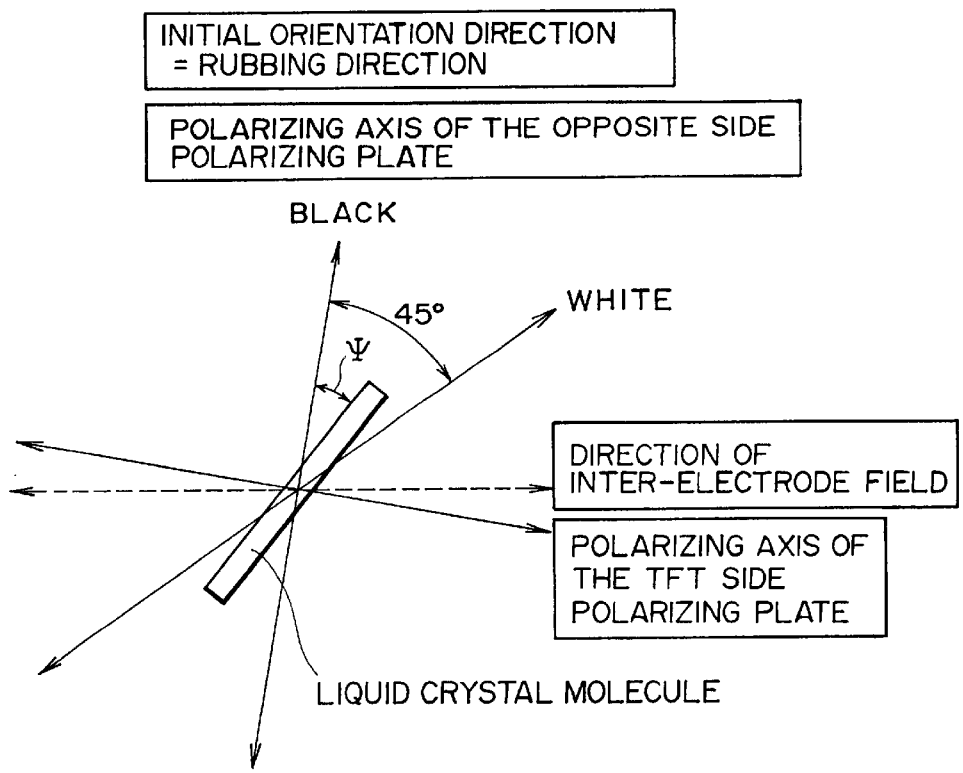
FIG. 5 is a diagram showing the display mechanism of the IPS system.

However, according to the liquid crystal layer, in the case where the retardation is less than 0.12 $\mu$m, and in the case where the retardation is more than 0.18 $\mu$m, a good display cannot be obtained at a visual angle of about 70 degrees. The relation between the retardation and the visual angle which was found by the inventor of the present application will be described below. FIG. 5 is a diagram showing the display mechanism of the IPS system. The case where the dielectric constant anisotropy of the liquid crystal molecule is positive is shown in FIG. 5.

In the state where the electric field is not applied, the initial orientation direction of the liquid crystal molecule is determined by the rubbing direction of the TFT side substrate, and the liquid crystal molecules are aligned at right angles to the direction of the polarizing axis of the TFT side polarizing plate. In this state, the incident light polarized by the TFT side polarizing plate is not polarized by the liquid crystal molecule. Accordingly, the light is almost completely cut off by the opposite side polarizing plate. As a result, the screen becomes in the state of black display.

On the other hand, when a lateral electric field generated between the picture element electrode and the common electrode is applied to a liquid crystal molecule, the liquid crystal molecule rotates by the interaction of the dielectric constant anisotropy thereof and the surrounding lateral electric field as mentioned above. As a result, by the rotation of the liquid crystal molecule, the incident light to the liquid crystal display panel becomes elliptically polarized light just before transmitting through the opposite side polarized plate, and the components in the direction corresponding to the transmission axis of the opposite side polarizing plate of the elliptically polarized light is emitted from the display panel. Then, the time-averaged value of the intensity of the outgoing light is sensed by human eyes.

The degree of the elliptically polarized light changes according to the angle $\Psi$ between the orientation direction of the liquid crystal molecule and the initial orientation direction thereof shown in FIG. 5. The standardized transmission factor T/T0 of the liquid crystal display panel in this case is approximated by the following Expression 1:

$$T/T0 = \sin^2(2\Psi)\sin^2\{(\Delta n \cdot d)/\lambda \times \pi)\} \tag{1}$$

Wherein $\Psi$ is the angle between the average liquid crystal orientation direction and the initial orientation direction, and $\Delta n$ is the refractive index anisotropy of the liquid crystal molecule, and d is the thickness of the liquid crystal layer (cell gap), and $\lambda$ is the wavelength of the transmitted light.

It is clear from Expression 1 that the transmission factor is minimum when angle $\Psi$ is 0 degree, and it is maximum when angle $\Psi$ is 45 degrees. Furthermore, in order to maximize the transmission of light with a certain wavelength $\lambda 1$, it is sufficient to fulfill the condition of the following Expression 2:

$$(\Delta n \cdot d)/\lambda 1 = 1/2 \tag{2}$$

For example, in the case of maximizing the transmission of the light with a wavelength near the green (500 nm) where a person feels brightest, it is sufficient that $\lambda 1 = 500$ nm is substituted in Expression 2 to make the retardation "$\Delta n \cdot d$" be 0.250 $\mu$m.

Figure 6:
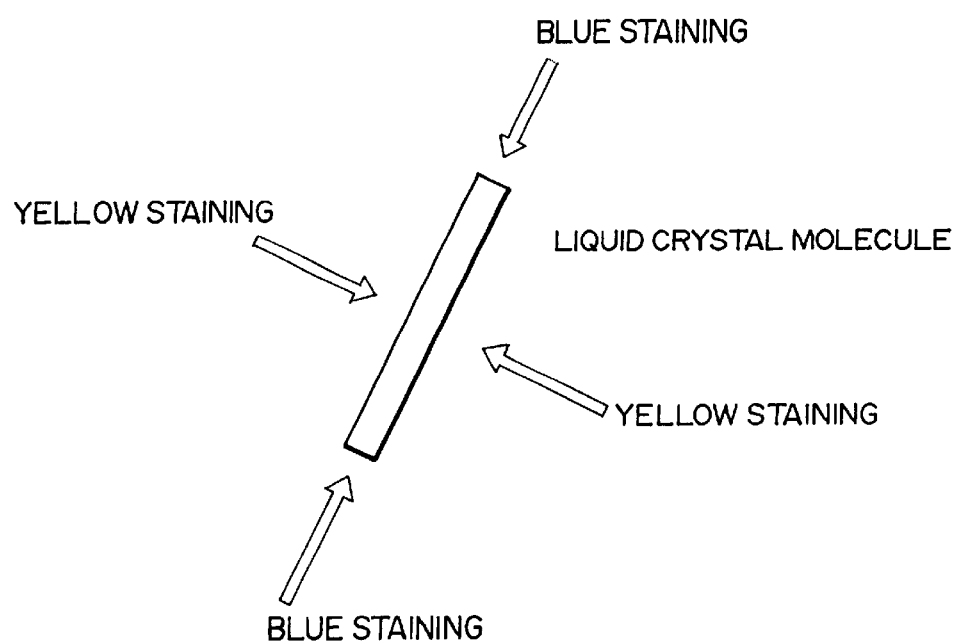
FIG. 6 is a schematic diagram showing the staining phenomenon.

Next, the reason why a staining phenomenon such as the yellow shift occurs will be described. FIG. 6 is a schematic diagram showing the staining phenomenon. As shown in FIG. 6, the staining phenomenon is different according to the line of sight to the liquid crystal molecule, since the liquid crystal molecule has the refractive index anisotropy. For example, blue staining occurs in the case where the liquid crystal molecule is viewed in the major axis direction, and in the case where it is viewed in the minor axis direction, yellow staining occurs.

Figure 7:
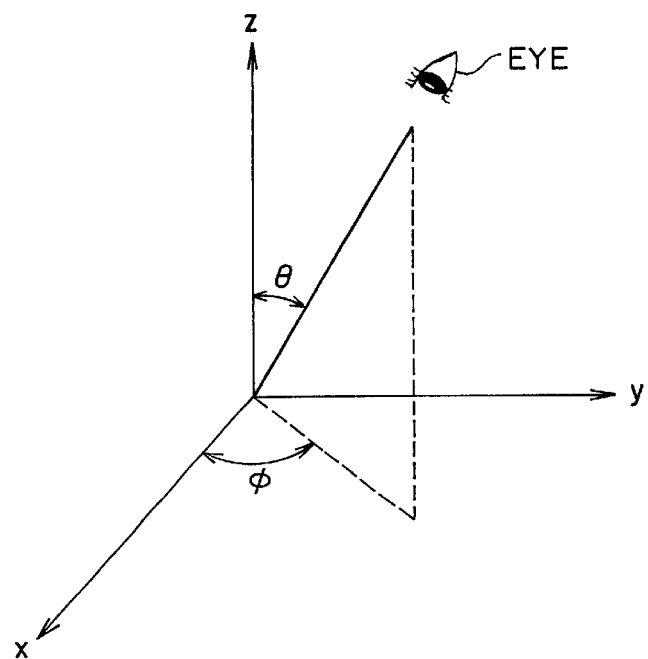
FIG. 7 is a schematic diagram showing definitions of the visual angle $\theta$ and the azimuth $\phi$.

Next, the mechanism through which such a staining phenomenon occurs will be described. In the following Table 1, theoretical expressions are shown, which is an expression to obtain the effective value $\Delta n'$ of the refractive index anisotropy and the effective value d' of the thickness of the liquid crystal layer in the case where the liquid crystal molecule is viewed in the major axis direction or in the minor axis direction at the visual angle $\theta$. Furthermore, the definitions of the visual angle $\theta$ and the azimuth $\phi$ in FIG. 7. In FIG. 7, x-y plane corresponds to the display surface of the liquid crystal display panel, and z-axis corresponds to the axis perpendicular to the display surface of the liquid crystal display panel.

TABLE 1

| | $\Delta n'$ | d' |
|---|---|---|
| Major axis direction | $\dfrac{n_e \cdot n_0}{\sqrt{n_e^2 \sin^2\theta + n_0^2\cos^2\theta}} - n_e$ | $\dfrac{d}{\cos\theta}$ |
| Minor axis direction | $\Delta n$ | $\dfrac{d}{\cos\theta}$ |

Figure 8A:
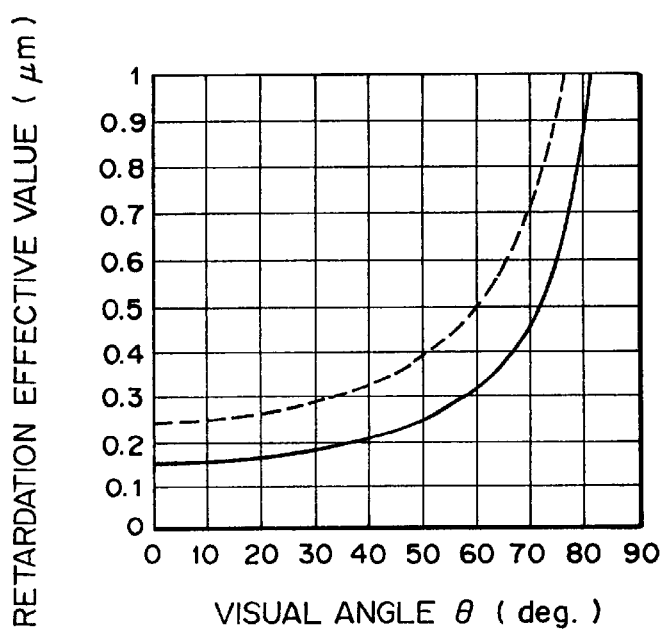
FIG. 8A and FIG. 8B are graphs showing the dependence of the retardation effective value ($\Delta n' \cdot d'$) on the visual angle $\theta$ in the minor axis direction and in the major axis direction respectively found from the theoretical expression.
Figure 8B:
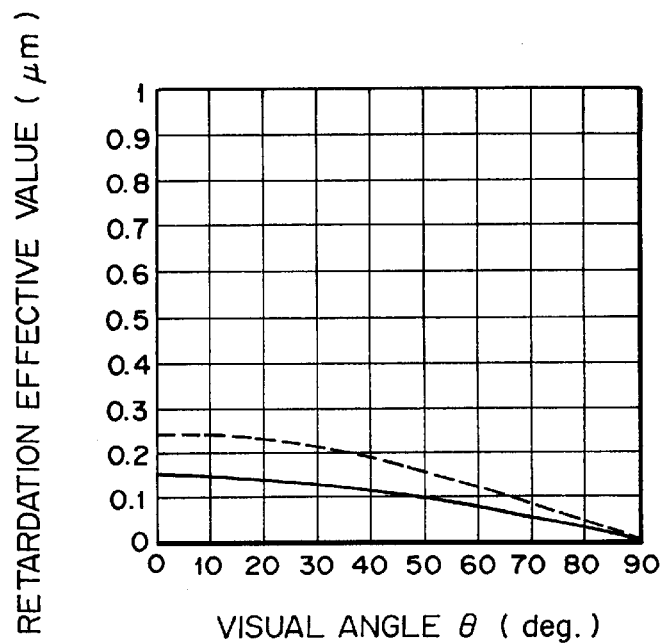

In Table 1, $n_e$ is the refractive index in the major axis direction of liquid crystal, and $n_o$ is the refractive index in the minor axis direction of liquid crystal, and $\Delta n$ is the absolute value of $(n_e - n_o)$, and d is the thickness of the liquid crystal layer (cell gap). FIG. 8A is a graph showing the dependence of the retardation effective value ($\Delta n' \cdot d'$) on the visual angle $\theta$ in the minor axis direction found from the theoretical expression. FIG. 8B is a graph showing the dependence of the retardation effective value ($\Delta n' \cdot d'$) on the visual angle $\theta$ in the major axis direction found from the theoretical expression. The solid lines in FIG. 8A and FIG. 8B show the effective value in the case where the retardation is 0.15 $\mu$m, which is in the range of the present invention. The broken lines show the effective value in the case where the retardation is 0.25 $\mu$m, which is out of the range of the present invention.

As shown in FIG. 8A, when the liquid crystal molecule is viewed in the minor axis direction thereof, the retardation effective value becomes extremely higher as the visual angle $\theta$ becomes larger. Furthermore, as shown by the above Expression 2, the retardation effective value and the wavelength of the maximum transmission are proportional to each other. Accordingly, in the minor axis direction, the retardation effective value becomes larger as the visual angle $\theta$ becomes larger, and the wavelength of the maximum transmission shifts to the yellow side. On the other hand, as shown in FIG. 8B, when the liquid crystal molecule is viewed in the major axis direction thereof, the retardation effective value becomes smaller as the visual angle $\theta$ becomes larger. Accordingly, the maximum wavelength of transmitted light shifts to the blue side.

Thus, when the liquid crystal molecule is viewed in the major axis direction thereof, the retardation effective value becomes smaller so that the picture may be stained blue, and when the liquid crystal molecule is viewed in the minor axis direction thereof, the retardation effective value becomes larger so that the picture may be stained yellow. Especially, when the liquid crystal molecule is viewed in the minor axis direction, the picture extremely shifts to yellow staining as the visual angle $\theta$ becomes larger.

Furthermore, as shown in Expression 1 and Expression 2, in the case where the retardation effective value is 0.5 $\mu$m or less, the transmission factor of light with the yellow wavelength is low. Moreover, as shown in FIG. 8A, supposing that the retardation ($\Delta n \cdot d$) is 0.25 $\mu$m, the retardation effective value in the minor axis direction is about 0.5 $\mu$m when the visual angle $\theta$ is 60 degrees. On the other hand, supposing that the retardation ($\Delta n \cdot d$) is 0.15 $\mu$m, the visual angle $\theta$ at which the retardation effective value exceeds about 0.5 $\mu$m is larger than 70 degrees. Accordingly, by making the retardation ($\Delta n \cdot d$) be 0.15 $\mu$m, yellow staining when the liquid crystal display panel is viewed from a severely slant view can be restrained.

This effect can be obtained when the retardation ($\Delta n \cdot d$) is in the range of 0.15 $\mu$m±0.03 $\mu$m. Therefore, the product $\Delta n \cdot d$ of the refractive index anisotropy $\Delta n$ of liquid crystal and the thickness d of the liquid crystal layer should be 0.12 to 0.18 $\mu$m.

Furthermore, since the luminosity of blue is lower than that of yellow, the quality of display is improved by restraining the staining of yellow with a high luminosity.

Therefore, according to the present embodiment, the wavelength of the maximum transmission through the liquid crystal display panel may shift to the blue side, and yellow staining does not occur even if the display screen is viewed from a severely slant view. Also, the color change at all angles of visibility and all azimuths becomes small, and the color reproducibility is good regardless of the angle of visibility.

Examples of liquid crystal materials available to the present invention are shown in FIG. 9. These liquid crystal materials can be used individually or in such a way that 2 or more kinds thereof are mixed. It is preferable for the refractive index anisotropy $\Delta n$ to be 0.04 to 0.07, that is, it is preferable to be comparatively smaller. For example, it is preferable to use a liquid crystal material in FIG. 9 whose refractive index anisotropy $\Delta n$ is in the range of 0.06 to 0.07 shown.

Furthermore, the thickness d of the liquid crystal layer may be specified by the cell gap in which the liquid crystal material is sealed. This cell gap may be determined by the diameter of a spacer inserted between the opposite side substrate and the TFT side substrate. Moreover, it is preferable that the thickness d of the liquid crystal layer (cell gap) is 2 to 2.5 µm for the display characteristics.

Furthermore, in the case where the display panel is viewed at a visual angle of 70 degrees when halftone of white is displayed, it is preferable that the x-coordinate of the chromaticity indication in Commission Internationale d'Eclairage chromaticity diagram is 0.35 or less at all azimuths and the y-coordinate of the chromaticity indication is 0.35 or less at all azimuths. Consequently, yellow staining of the display panel is more restrained even in the case where the display panel is viewed from a severely slant view.

Still furthermore, in the case where the display panel is viewed at a visual angle of 70 degrees when halftone of white is displayed, it is more preferable that the x-coordinate of the chromaticity indication in Commission Internationale d'Eclairage chromaticity diagram is 0.2 to 0.35 and the y-coordinate of the chromaticity indication is 0.2 to 0.35. Especially, it is preferable that the y-coordinate of the chromaticity indication is 0.25 or more. Consequently, the color reproducibility is extremely good at all azimuths even in the case where the display panel is viewed from a severely slant view, and the difference of the chromaticity between a slant view and a front view becomes small.

An embodiment of the present invention will concretely be described below by comparing it with a comparative example, which is out of the claims thereof. The retardation ($\Delta n \cdot d$) of the liquid crystal layer in the embodiment is 0.15 µm, and the retardation ($\Delta n \cdot d$) of the liquid crystal layer in the comparative example is 0.302 µm. These structures are similar to those shown in the above FIG. 1 to FIG. 4. Then, halftone of white is displayed and the observation is performed at a visual angle $\theta$ of 70 degrees.

Figure 10A:
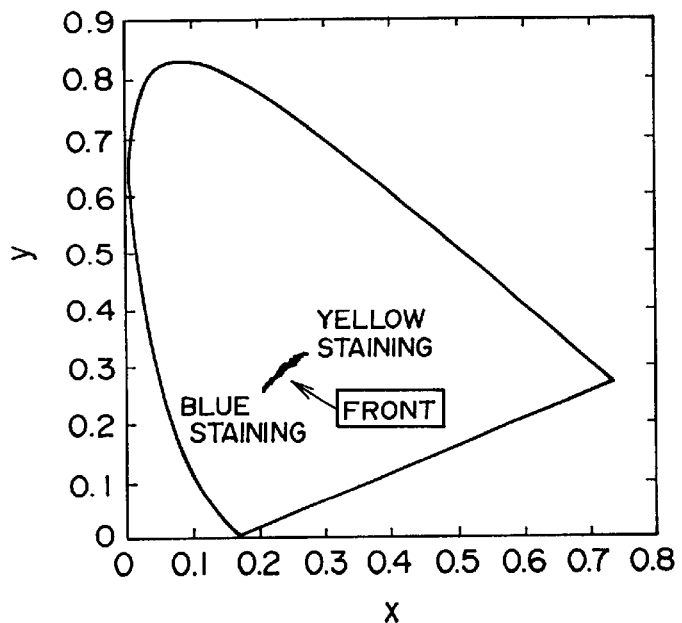
FIG. 10A and FIG. 10B are Commission Internationale d'Eclairage chromaticity diagrams respectively showing the measurements of an embodiment and a comparative example.
Figure 10B:
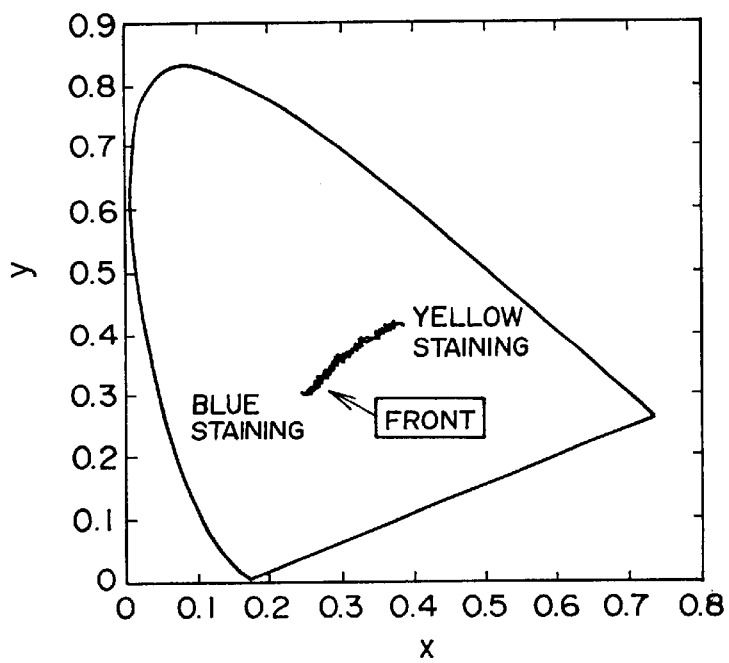

FIG. 10A is a Commission Internationale d'Eclairage chromaticity diagram showing the measurements of the embodiment, and FIG. 10B is a Commission Internationale d'Eclairage chromaticity diagram showing the measurements of the comparative example. These show the x-y chromaticity changes in the case where halftone of white is displayed and the observation is performed at a visual angle $\theta$ of 70 degrees and at an azimuth $\phi$ of 0 to 360 degrees. In FIG. 10A and FIG. 10B, the arrows show the chromaticity coordinate when viewed from the front.

As shown in 10A, when the liquid crystal display panel is viewed from the front (visual angle $\theta$=0 degree), a little blue staining occurs, but yellow staining is not noticeable even if the visual angle $\theta$ becomes larger. Furthermore, the chromaticity shift is small at all angles of visibility. To be concrete, in regard to the chromaticity coordinates (x, y), x is 0.3 or less and y is 0.35 or less at an azimuth $\phi$ of 0 to 360 degrees. In regard to the chromaticity distribution, x-coordinate is 0.2 to 0.35 and y-coordinate is 0.2 to 0.35, which are in the extremely narrow range.

Moreover, as mentioned above, the effect of blue staining of the whole display panel does not cause any problem to the human vision, since the luminosity of blue itself is low. That is, the effect to restrain the staining of yellow with a high luminosity is larger.

On the other hand, as shown in FIG. 10B, in the comparative example, the yellow shift in the case of a slant view is large.

The reason why such a difference occurs is as follows: In the case where the retardation ($\Delta n \cdot d$) is 0.302 µm like the comparative example, when the visual angle $\theta$ is taken as 70 degrees, the retardation effective value in the minor axis direction (direction of yellow staining) of the liquid crystal molecule obtained from the theoretical expression shown in Table 1 is 0.88 µm. On the other hand, in the case where the retardation ($\Delta n \cdot d$) is 0.15 µm like the embodiment, when the visual angle $\theta$ is similarly taken as 70 degrees, the retardation effective value in the minor axis direction is about 0.45 µm. From Expression 1 and Expression 2, in the case where the retardation effective value is about 0.45 µm, the yellow staining of the picture is restrained since the transmission factor of yellow light is low. That is, when the liquid crystal display panel is viewed from a severely slant view, for example, at a visual angle $\theta$ of 70 degrees, the yellow staining is restrained.

What is claimed is:

1. An active matrix type liquid crystal display, comprising:
    a liquid display panel which includes:
        two transparent substrates each disposed to have a selected surface facing each other with a separation d, each of the substrates including an orientation film formed by rubbing disposed upon the selected respective facing surfaces, and each of the substrates including a polarizing layer on the sides opposite to the respective facing surfaces; and
        a liquid crystal layer disposed between the substrates, wherein a product "$\Delta n \cdot d$" of a refractive index anisotropy $\Delta n$ of a liquid crystal material in said liquid crystal layer and thickness d of said liquid crystal layer having a value of about 0.12 to 0.18 µm, wherein the orientation films are disposed to have orientation directions that are at reverse angles to each other, and each one of the orientation films is disposed to have a direction that is orthogonal to the respective polarizing layer on the opposite facing surface of the substrate,
        wherein at least one of the transparent substrates is a thin film transistor (TFT) substrate having at least two electrodes providing an in plane switching system for the liquid crystal layer.

2. The active matrix type liquid crystal display according to claim 1, wherein x-coordinate and y-coordinate in Commission Internationale d'Eclairage chromaticity diagram are 0.35 or less at all azimuths when halftone of white is displayed and said liquid crystal display panel is viewed at a visual angle of 70 degrees.

3. An active matrix type liquid crystal display according to claim 1, wherein x-coordinate and y-coordinate in Commission Internationale d'Eclairage chromaticity diagram are 0.2 to 0.35 at all azimuths when halftone of white is displayed and said liquid crystal display panel is viewed at a visual angle of 70 degrees.

4. An active matrix type liquid crystal display according to claim 1, wherein said refractive index anisotropy $\Delta n$ is 0.04 to 0.07.

5. An active matrix type liquid crystal display according to claim 1, wherein said thickness of a liquid crystal layer is 2 to 2.5 µm.

6. An active matrix type liquid crystal display according to claim 1, wherein said liquid crystal display panel comprises at least two electrodes which are used for applying an electric field to said liquid crystal layer in parallel with said two substrates.

7. An active matrix type liquid crystal display according to claim 1, wherein said liquid crystal display panel comprises:

a voltage applier which applies an electric field to said liquid crystal layer in parallel with said two substrates, said voltage applier being connected to one of said substrates; and a control element which controls ON/OFF of said electric field for each display picture element.

8. An active matrix type liquid crystal display according to claim 1, wherein said liquid crystal display panel comprises:
- a plurality of pieces of display picture elements arranged like a matrix;
- a scanning line and a signal line connected to said display picture elements; and
- a controller which controls electric potential of said scanning line, and one of said substrates comprises:
- a transparent substrate;
- a picture element electrode provided on said transparent substrate for each of said display picture elements, said picture element electrode being connected to said signal line;
- a common electrode provided on said transparent substrate and common to each of said display picture elements, said picture element electrode and said common electrode being arranged to apply an electric field of components substantially in parallel with the surface of said transparent substrate to said liquid crystal layer;
- a switching element provided on said transparent substrate and connected to said scanning line, said switching element shifting ON/OFF between said picture element electrode and said signal line; and
- an orientation film provided on said transparent substrate.

* * * * *